United States Patent
Comiskey, Jr.

(10) Patent No.: US 7,513,726 B1
(45) Date of Patent: Apr. 7, 2009

(54) MATERIAL-SECURING TAILGATE PROTECTOR

(76) Inventor: Donald Vincent Comiskey, Jr., 4N224 Wiant Rd., West Chicago, IL (US) 60185

( * ) Notice: Subject to any disclaimer, the term of this patent is extended or adjusted under 35 U.S.C. 154(b) by 358 days.

(21) Appl. No.: 11/295,860

(22) Filed: Dec. 7, 2005

Related U.S. Application Data

(60) Provisional application No. 60/641,192, filed on Jan. 4, 2005.

(51) Int. Cl.
B60P 7/08 (2006.01)
(52) U.S. Cl. .............. 410/32; 410/35; 410/46; 410/89; 296/3
(58) Field of Classification Search .............. 410/31, 410/32, 34, 35, 36, 42, 46, 89, 91, 94, 95, 410/121, 129, 140; 296/3, 26.08, 26.09, 296/26.11, 32, 39.2, 43, 51, 57.1; 224/402–405, 224/511, 522, 525, 526, 531, 533, 42.33, 224/565, 567
See application file for complete search history.

(56) References Cited

U.S. PATENT DOCUMENTS

| | | | |
|---|---|---|---|
| 4,389,067 A | * | 6/1983 | Rubio |
| 4,707,016 A | | 11/1987 | McDonald |
| 4,889,378 A | | 12/1989 | Sims |
| 5,000,503 A | | 3/1991 | Bernatek |
| 5,169,201 A | | 12/1992 | Gower |
| 5,197,642 A | | 3/1993 | Cortelli |
| 5,228,736 A | | 7/1993 | Dutton |
| 5,433,566 A | | 7/1995 | Bradley |
| 5,556,151 A | | 9/1996 | New et al. |
| 6,210,087 B1 | | 4/2001 | Bacon |
| 6,575,516 B2 | | 6/2003 | Webber |
| 7,044,699 B1 | * | 5/2006 | St. Denis ............ 410/34 |

* cited by examiner

Primary Examiner—Stephen Gordon

(57) ABSTRACT

A tailgate protector (1) having a structural frame (3) combined with a plurality of spaced protrusions (2). The structural frame (3) is sized and shaped to mount to the upper edge of a closed vehicle tailgate, such that the protrusions (2) perpendicularly extend above the upper edge of the tailgate. Material being transported by the vehicle and supported by the tailgate upper edge is placed on the structural frame (3) within the spacings between the protrusions (2). The structural frame (3) acts to protect the surface of the tailgate edge, while the protrusions (2) restrict the side to side movement of the transported material. Thus, the tailgate protector (1) effectively provides a quick and convenient means for securing the transported material while protecting the tailgate edge.

1 Claim, 15 Drawing Sheets

Prior-art
Reference

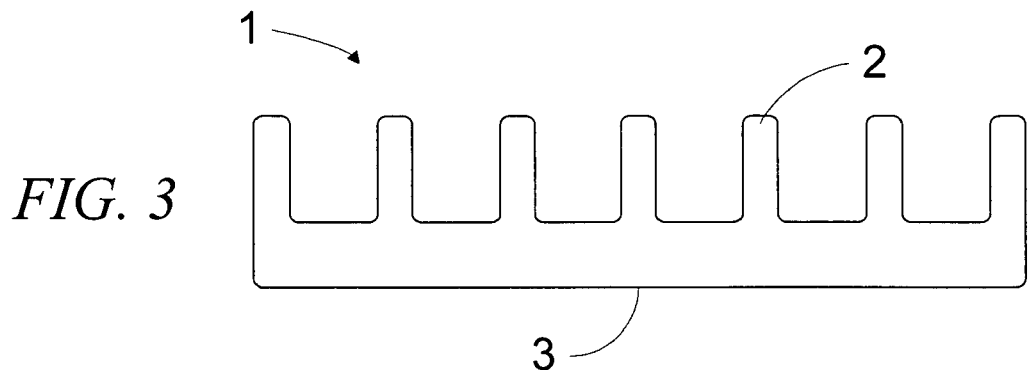
FIG. 3
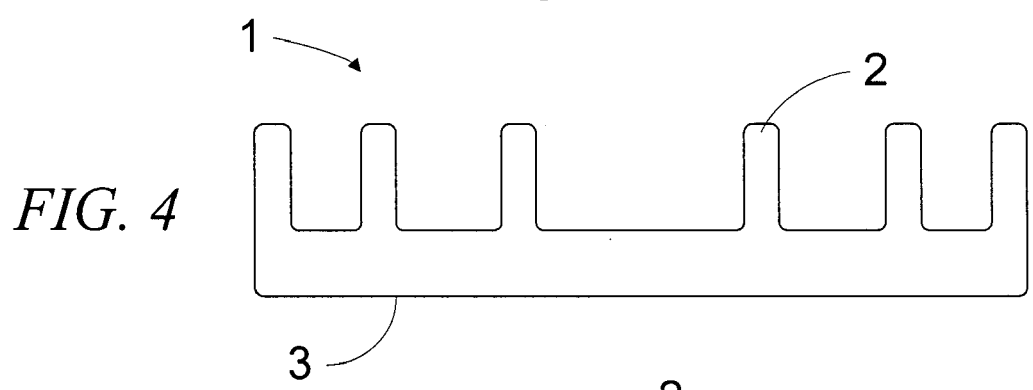
FIG. 4
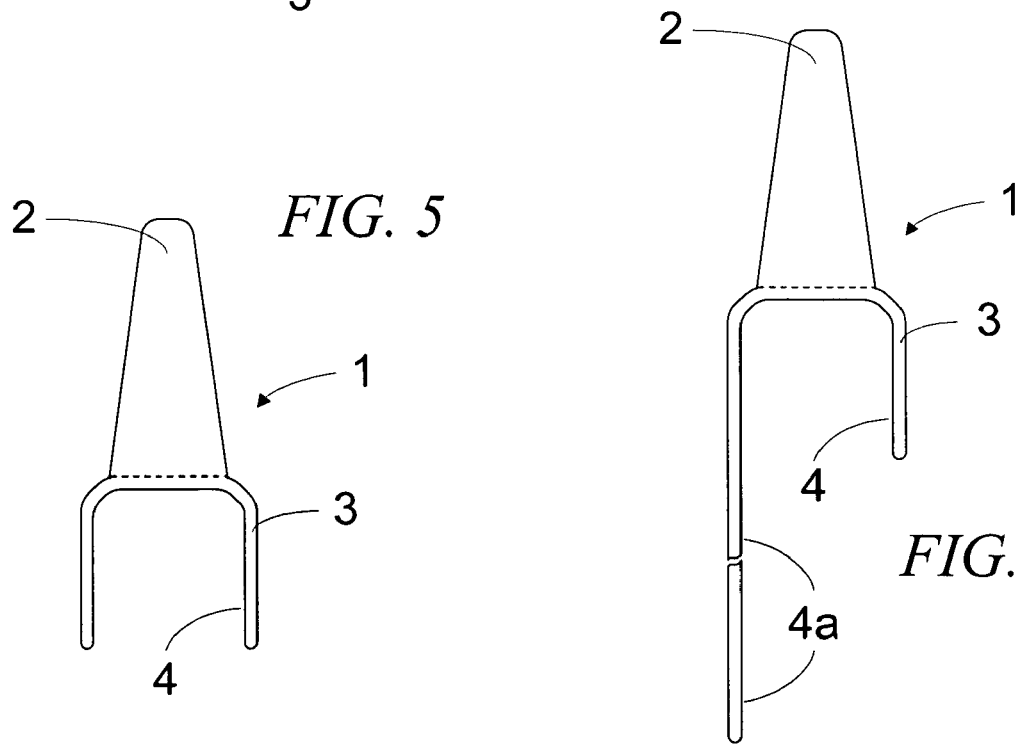
FIG. 5
FIG. 6

MATERIAL-SECURING TAILGATE PROTECTOR

CROSS-REFERENCE TO RELATED APPLICATIONS

This application claims the benefit of provisional patent application Ser. No. 60/641,192, filed on Jan. 4 of 2005 by the present inventor.

BACKGROUND OF INVENTION

1. Field of Invention

This invention relates to vehicular tailgate protectors, specifically tailgate protectors that cover at least the upper edge of a vehicle tailgate in order to protect the tailgate edge from damage when transporting material.

2. Description of Prior Art

A number of devices intended to protect the upper edge of a vehicle tailgate are known in the related art. Most prior art tailgate protectors resemble the protector introduced in FIG. 1 for reference purposes. The protector is shown to be mounted to the top edge of a vehicle tailgate, in this case the tailgate of a pickup truck. Such tailgate protectors are usually comprised of a plastic or metal material and are commonly mounted to the tailgate through the use of fasteners or adhesives. In some instances the protector is made such that it covers only the upper edge of the tailgate, while in other instances the protector also extends to cover the interior wall of the tailgate. In either case, the top side of the protector that runs parallel with the top edge of the tailgate is normally comprised of a relatively flat outer surface. In some instances the surface may be substantially flat, while in other instances the surface may include small decorative ridges and/or depressions, such as those associated with a diamond grid pattern.

In general, tailgate protectors are usually installed to enhance the appearance of the vehicle and/or protect the upper edge of the tailgate. Protection of the upper edge of the tailgate is particularly desirable when the tailgate edge is used to support long material that is being transported in the vehicle cargo area. For example, a pickup truck with an eight foot bed might be used to transport twelve foot long dimensional lumber (2×4, 2×6, etc.) by placing the lumber in the truck bed with the tailgate in its closed (upright) position, such that the lumber rests on the tailgate upper edge, allowing a portion of the lumber to extend beyond the back of the truck. This method of transporting long material is normally preferred over the alternate method of transporting material with the tailgate in its open (down) position, in that the material is prone to sliding out of the back of the vehicle when the tailgate is open.

Even though the prior art tailgate protectors provide a reasonable amount of protection for the tailgate upper edge, they do not provide a convenient method for securing the transported material being supported by the tailgate edge. The material is therefore prone to sliding from side to side along the tailgate edge when being transported in the vehicle. Although this is especially true when the vehicle is making turns, it can also occur due to normal driving vibration and/or bumps and dips in the road being driven upon. The unsecured sliding material not only presents a potentially dangerous situation, but can also abrade the protector surface and/or cause damage to vehicle components that are adjacent to the tailgate, such as the bed rails of a pickup truck. To prevent material from sliding along the surface of the tailgate protector, vehicle owners commonly use securing implements, such as rope, twine, straps, bungee cords, and the like, to tie the material down to other parts of the vehicle, such as bumpers, bed rails, side rails, tie-down anchors, trailer hitches, and undercarriage frame members. This securing method can add an appreciable amount of time and inconvenience to the material loading process. Furthermore, this securing method is dependent upon the reliability of the securing implement being used and the way in which it is installed. For example, it's not uncommon for a knot to become untied, for twine and rope to loosen or fray, or for straps and bungee cords to snap, causing the load to become unsecured.

Accordingly, when considering the above disadvantages associated with transporting material using the prior art tailgate protectors, there is a definite need for a new and improved tailgate protector that addresses the problems associated with securing the material being transported.

BRIEF SUMMARY OF THE INVENTION

The present invention is a vehicle tailgate protector that incorporates a plurality of spaced protrusions that perpendicularly extend above the upper edge of a closed tailgate. The spacing and height of the protrusions allow transported material to be placed between the protrusions so as to confine the side to side movement of the material, therefore providing a quick and convenient means for securing the material. The tailgate protector, which would normally be comprised of a plastic, rubber, and/or metal material, can be constructed in various forms to accommodate different mounting configurations and degrees of service.

OBJECTS AND ADVANTAGES

The primary object of the present invention is to provide a new and improved vehicle tailgate protector that not only provides protection for the upper edge of a vehicle tailgate, but also provides a quick and convenient method for reliably securing material that is being transported by the vehicle and supported by the tailgate edge. This securing feature of the present invention simplifies the material loading process by eliminating the need for securing implements such as rope, twine, straps, bungee cords, and the like. This feature also prevents possible vehicle damage and/or potentially dangerous situations that can occur when transporting material that is either originally unsecured or that which has become unsecured due to failure of a securing implement.

Another object of the present invention is to provide a material-securing tailgate protector that can be manufactured in several different forms to accommodate various levels of service and sophistication. Depending on its manufactured form, the tailgate protector can be made available to the consumer as part of original vehicle equipment, as a dealer installed accessory, as an aftermarket accessory, or as a temporary transporting device.

Further objects and advantages of the present invention will become apparent upon consideration of the ensuing description and drawings.

DRAWING FIGURES

FIGS. 3 and 4 show examples of the present invention where the tailgate protector, having a plurality of protrusions, is ultimately provided as a one-piece assembly.

FIG. 5 shows an example side view of the tailgate protectors of FIGS. 3 and 4.

FIG. 6 shows an example side view similar to FIG. 5 with the exception of having one elongated frame surface.

DESCRIPTION OF THE PREFERRED EMBODIMENT

Figure 1:
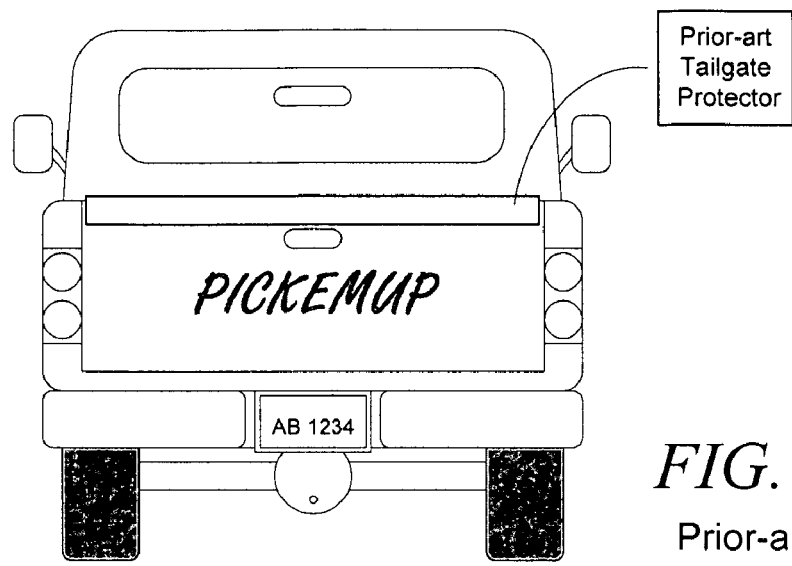
FIG. 1 shows, for reference purposes, a prior-art tailgate protector mounted to the upper edge of a vehicle tailgate.
Figure 2:
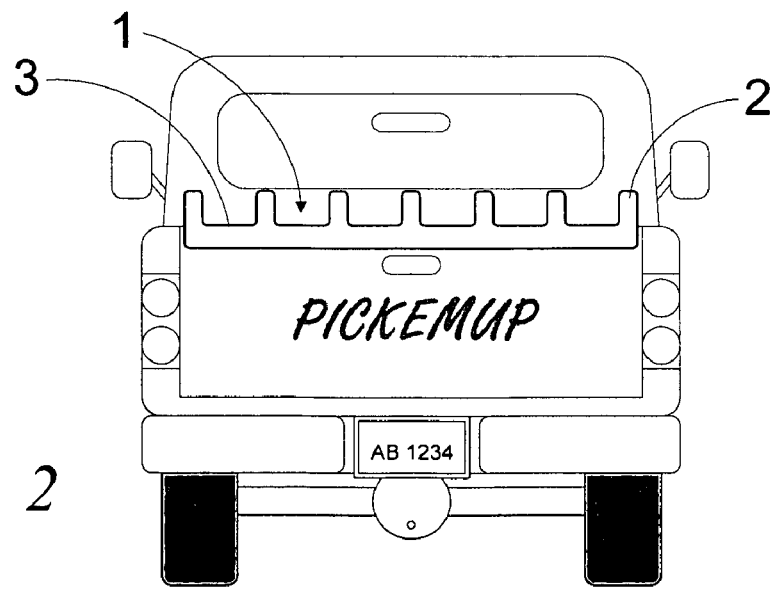
FIG. 2 shows a tailgate protector of the present invention mounted to the upper edge of a vehicle tailgate.

Referring to FIG. 2, a basic tailgate protector 1 embodying the general principles and concepts of the present invention is shown to be mounted to a vehicle tailgate. Unlike the prior-art device shown for reference purposes in FIG. 1, this preferred embodiment of the present invention tailgate protector 1 is shown to comprise a plurality of spaced protrusions 2 that are combined with a structural frame 3. The structural frame 3 mounts to the upper edge of the vehicle tailgate, while the combined protrusions 2 perpendicularly extend above the upper edge of the closed tailgate. This embodiment of the tailgate protector 1 would preferably be constructed as a one-piece assembly according to the below discussion of FIG. 3. The tailgate protector 1 would normally be comprised of a material such as plastic, rubber, metal, and/or other similar material suitable for exterior application on a vehicle. In general, the same materials used to construct prior-art protectors and other related vehicle accessories could also be used to construct the present invention tailgate protector 1.

The tailgate protector 1 could be mounted to the tailgate using commonly known mounting components, such as fasteners, molding clips, adhesives, and/or other similar components known in the art. In some instances, as will be discussed further, the tailgate protector 1 may be mounted for temporary use without using any mounting components. In this case, along with the case of using adhesives, the tailgate protector 1 would not require any mounting holes. In the case of using fasteners, the tailgate protector 1 may comprise mounting holes at predetermined locations. The predetermined locations could coincide with existing hardware associated with the vehicle tailgate. In general, the same techniques used to mount prior-art protectors could also be used to mount the present invention tailgate protector 1.

FIG. 3 shows the tailgate protector 1 of FIG. 2 as removed from the vehicle. Again, the tailgate protector 1 is shown to comprise a plurality of spaced protrusions 2 that are combined with a structural frame 3. Although the protrusions 2 are shown to be equally spaced in FIG. 3, the example in FIG. 4 illustrates that the tailgate protector 1 could be constructed using various spacing options. Ideally, the spacing between protrusions 2 would accommodate typical sizes of transported material. FIG. 5 presents an example side view of the tailgate protector 1 showing how the inner surface 4 of the structural frame 3 would be shaped to conform to the contour of a vehicle tailgate. The inner surface 4 would primarily cover the entire upper edge and a portion of the exterior and interior upper surfaces of the vehicle tailgate. FIG. 6 presents an alternative side view showing how the structural frame 3 might also have an elongated surface 4a to cover and protect a substantial portion of the interior surface of the vehicle tailgate.

As previously mentioned, this embodiment of the tailgate protector 1 would preferably be constructed as a one-piece assembly. This could be accomplished using various construction methods. In one approach, the protrusions 2 might be separate items that are fixedly attached to the structural frame 3 using standard attaching hardware or an attaching process such as staking, welding, riveting, adhesive bonding, or similar process. A more preferred approach would be to construct the tailgate protector 1 as a true one-piece assembly where the structural frame 3 and protrusions 2 are contiguously formed from one material. This could be accomplished, for example, by using a process such as injection molding, heat forming, stamping, casting, pressing, or other similar molding, forming, or shaping process. The type of material and process used to construct the tailgate protector 1 might depend on the level of service required by the application. The applications could range from an extremely rugged, precision-fit tailgate protector 1 for permanent original vehicle equipment or aftermarket installations, to an inexpensive, generic-fit tailgate protector 1 for temporary or light duty service.

Regarding original vehicle equipment or aftermarket installations, for example, the tailgate protector 1 could be a true one-piece assembly constructed of a durable impact-resistant material, such as ABS plastic, that is precisely shaped to fit a particular make of vehicle using one of the above forming methods. Such a tailgate protector 1 would be ideal for permanent installation on vehicles that frequently transport material, such as those used by the trade, construction, material delivery, and other similar commercial industries. On the other hand, such a tailgate protector 1 would also be well suited for permanent installation on residential vehicles where the transportation of material might be less frequent. This is especially true when considering the popularity and demand for sport trucks and sport utility vehicles (SUV's) with utilitarian features.

Regarding temporary or light duty service, for example, the tailgate protector 1 could be constructed as a true one-piece assembly using a thin, inexpensive plastic material formed by one of the above-mentioned forming methods. The inner surface 4 of the structural frame 3 of the inexpensive version of the tailgate protector 1 could be broadly shaped to temporarily fit over the upper edge of a majority of popularly-sized vehicle tailgates without using fasteners. Such an inexpensive version of the tailgate protector 1 might be available, for example, to consumers at home centers, hardware stores, lumber yards, and the like, where the consumer may only need the tailgate protector 1 for infrequent transportation of material.

OPERATION OF THE PREFERRED EMBODIMENT

With the tailgate protector 1 mounted to the upper edge of a closed vehicle tailgate, the user would simply place one end of the transported material into the vehicle cargo area while placing the other end of the material upon the structural frame 3 within the spacings between protrusions 2, such that a majority of the material is within the cargo area and a lesser portion of the material extends beyond the vehicle tailgate. The structural frame 3 acts to protect the surface of the tailgate, while the protrusions 2 act to secure the transported material by restricting its side to side movement. For example, a pickup truck with an eight foot bed might be used to transport twelve foot long dimensional lumber (2×4, 2×6, etc.). The user would place one end of the lumber into the cargo area while placing the other end of the lumber between the protrusions 2 of the tailgate protector 1, such that approximately three to four feet of the lumber extends beyond the back of the truck. The lumber would normally be of sufficient weight so as to limit its vertical movement, while the protrusions 2 would act to restrict the horizontal (side to side) movement of the lumber. As a result, in addition to protecting the surface of the tailgate, the tailgate protector 1 provides a quick and convenient method for loading and securing the lumber without additional securing implements.

ALTERNATIVE EMBODIMENTS

The present invention tailgate protector 1 can be constructed in various forms in accordance with the general concept and principles of the preferred embodiment discussed above. Various forms are illustrated in the following examples to demonstrate, without limiting the scope, other possible embodiments that are in keeping with the spirit of the present invention. The same materials and construction methods introduced in the above discussion of the preferred embodiment could also be used to construct the tailgate protectors 1 introduced in the following embodiments.

Figure 7A:
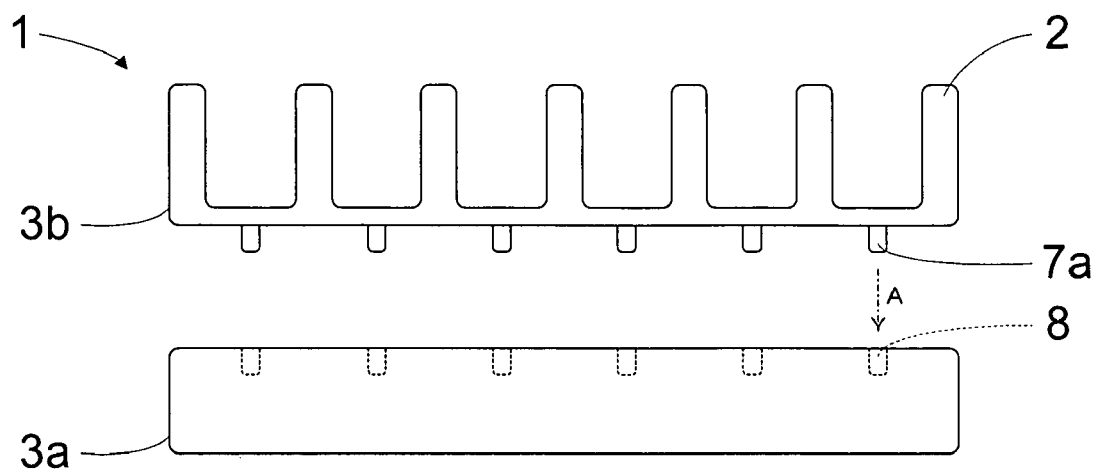
FIG. 7A shows an example of the present invention where the tailgate protector comprises an upper section and base section.
Figure 7B:
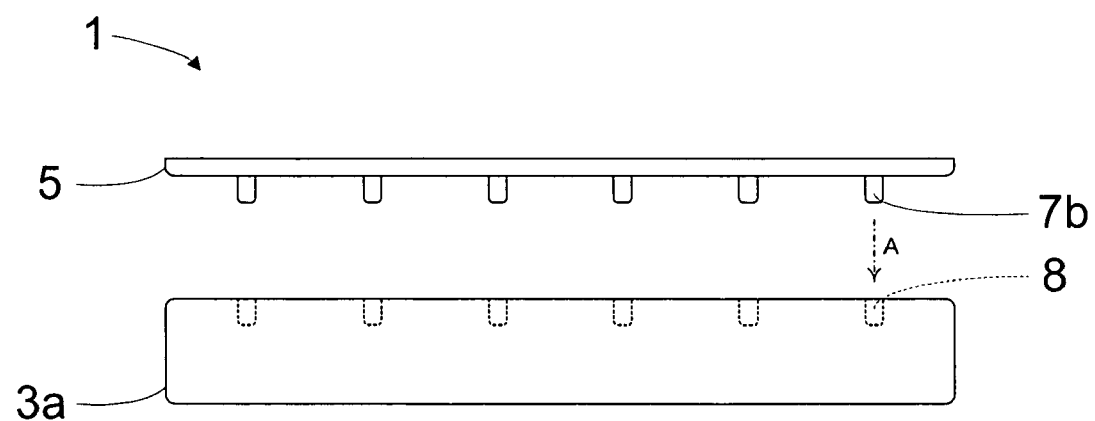
FIG. 7B shows the tailgate protector of FIG. 7A with an alternately used upper section.

FIGS. 7A and 7B show an example embodiment of the present invention where the tailgate protector 1 is primarily constructed as a two-piece assembly having an upper section 3b and a base section 3a. The upper section 3b is shown to comprise a plurality of protrusions 2 and a plurality of connecting components 7a. The base section 3a, which would mount over the upper edge of a vehicle tailgate, is shown to comprise a plurality of receiving components 8. With such an arrangement, the connecting components 7a of the upper section 3b removably mate with the receiving components 8 of the base section 3a, as indicated by arrow A, to allow for convenient installation or removal of the upper section 3b. To accomplish the mating operation, the connecting components 7a and receiving components 8 could be comprised of male and female components that can be joined by threading, press fitting, snap fitting, tongue and grooving, or other similar mating method. Preferably, the connecting components 7a and receiving components 8 would be integrally formed or captivated as part of the upper section 3b and base section 3a, respectively. Ultimately, the configuration of FIG. 7A allows for quick installation or removal of the upper section 3b and its protrusions 2, depending on the user's needs. In this example, with the upper section 3b installed, the overall assembly would resemble that of FIGS. 2 and 3, in that the upper section 3b and base section 3a effectively combine to serve the function of the structural frame 3.

FIG. 7B shows an example of how the upper section 3b of the tailgate protector 1 of FIG. 7A could be interchangeable with an alternate upper section 5 that includes no protrusions. The alternate upper section 5 would comprise alternate connecting components 7b that would identically match those of the upper section 3b of FIG. 7A, such that either the upper section 3b with its protrusions 2 or the alternate upper section 5 without protrusions could be mated with the base section 3a, depending on the user's needs.

Figure 8A:
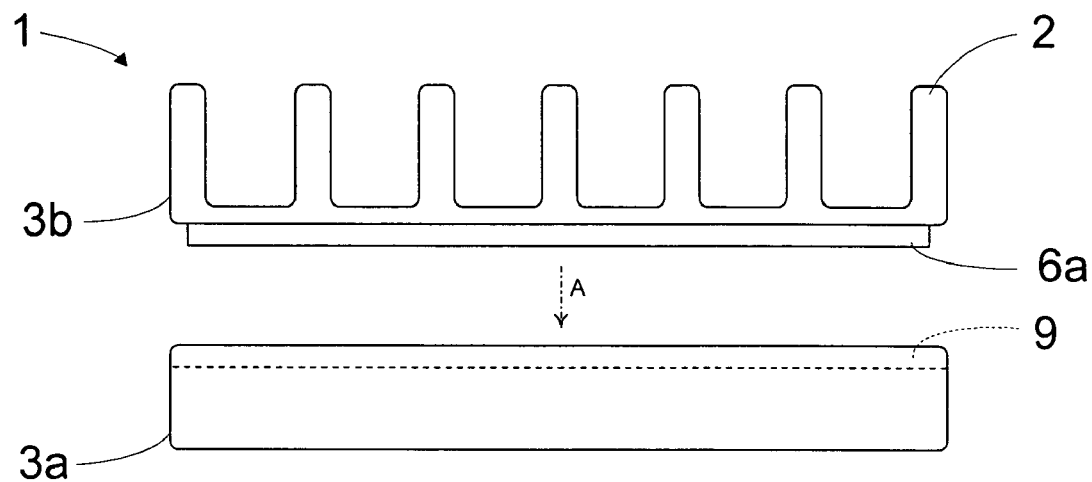
FIG. 8A shows a tailgate protector similar to FIG. 7A with the exception of having a single connecting member.
Figure 8B:
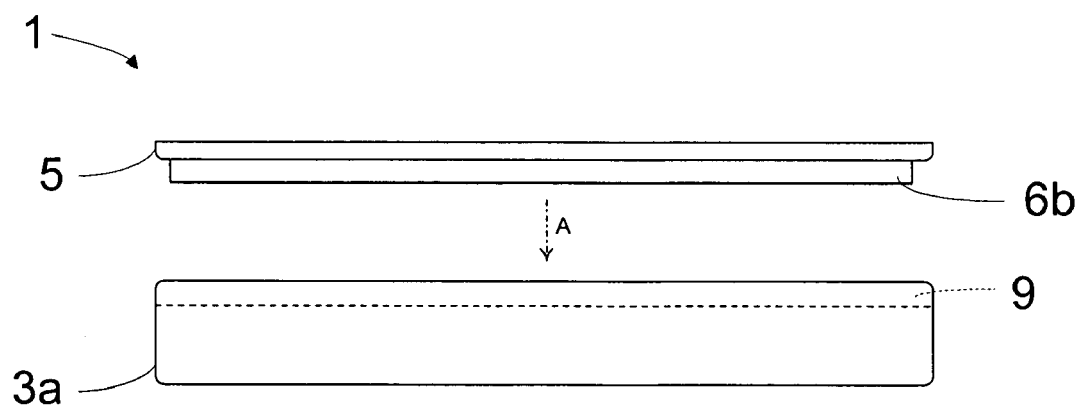
FIG. 8B shows the tailgate protector of FIG. 8A with an alternately used upper section.
Figure 16:
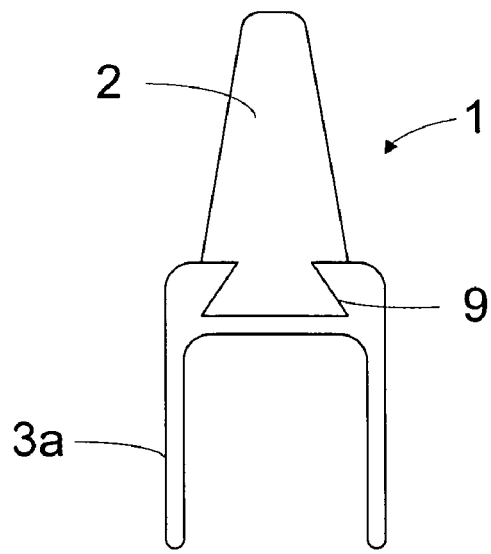
FIG. 16 shows an example side view of the present invention where the tailgate protector comprises an open-end track in a receiving component.

FIGS. 8A and 8B show an example tailgate protector 1 based on the same concept introduced in FIGS. 7A and 7B except that the upper section 3b or 5 mates to the base section 3a, as indicated by arrow A, by using a single elongated connecting component 6a or 6b and a single elongated receiving component 9. The elongated connecting components 6a and 6b could be comprised of a tongue-like member that is integrally formed or captivated as part of upper sections 3b and 5, respectively, while the elongated receiving component 9 could be comprised of a groove-like recess or raceway that is integrally formed or captivated as part of the base section 3a. The mating of the upper section 3b or 5 to the base section 3a could therefore be accomplished by employing a tongue and groove type of joining method. Depending on the shape of the tongue and groove, the upper section 3*b* or 5 could be either vertically or horizontally inserted into the base section 3*a*. In the case of being horizontally inserted, the tongue and groove joint formed by the elongated connecting component 6*a* or 6*b* and the elongated receiving component 9 could have a shape similar to the dovetail joint illustrated in the side view example of FIG. 16. With the upper section 3*b* installed, the overall assembly would resemble that of FIGS. 2 and 3, in that the upper section 3*b* and base section 3*a* effectively combine to serve the function of the structural frame 3.

Figure 9:
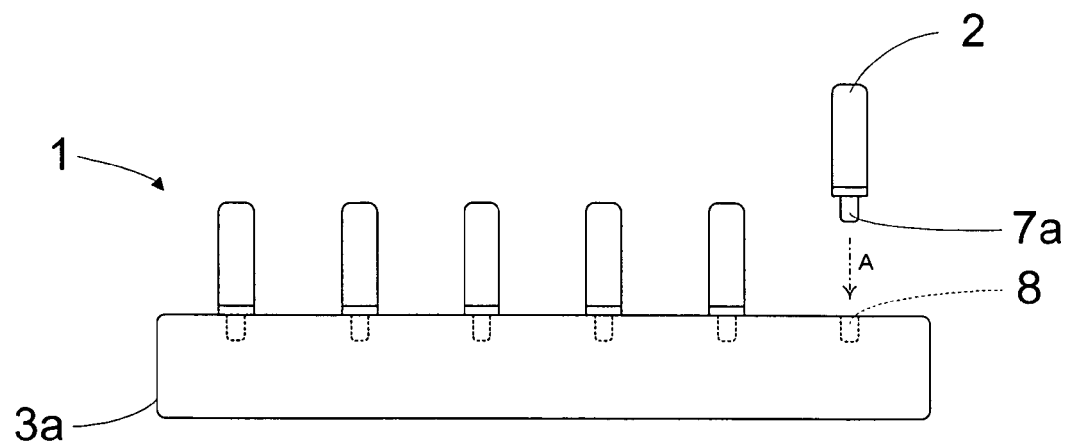
FIG. 9 shows an example of the present invention where the tailgate protector comprises a plurality of individual protrusions.

FIG. 9 shows an example embodiment of the present invention where the tailgate protector 1 is comprised of a plurality of individual protrusions 2 that mate with a base section 3*a* which would be mounted to the upper edge of a vehicle tailgate. The base section 3*a* serves the function of the structural frame 3 of FIGS. 2 and 3. Each individual protrusion 2 comprises a connecting component 7*a* that mates with a corresponding receiving component 8 in the base section 3*a*, as indicated by arrow A. The characteristics of each connecting component 7*a* and the receiving component 8 would be similar to the corresponding components in the above description of FIG. 7A. The connecting component 7*a* would ideally be an integral part of each individual protrusion 2. With such an arrangement, the individual protrusions 2 could be selectably mated with the base section 3*a*, depending on the desired spacing between protrusions 2. In one extreme, all of the protrusions 2 may be inserted into the base section 3*a*, while in the other extreme, none of the protrusions 2 may be inserted. In between these two extremes, the user can choose to insert or remove certain protrusions 2 in order to obtain various spacings between protrusions 2. This may be desirable, for example, when transporting several different widths of material.

Figure 10:
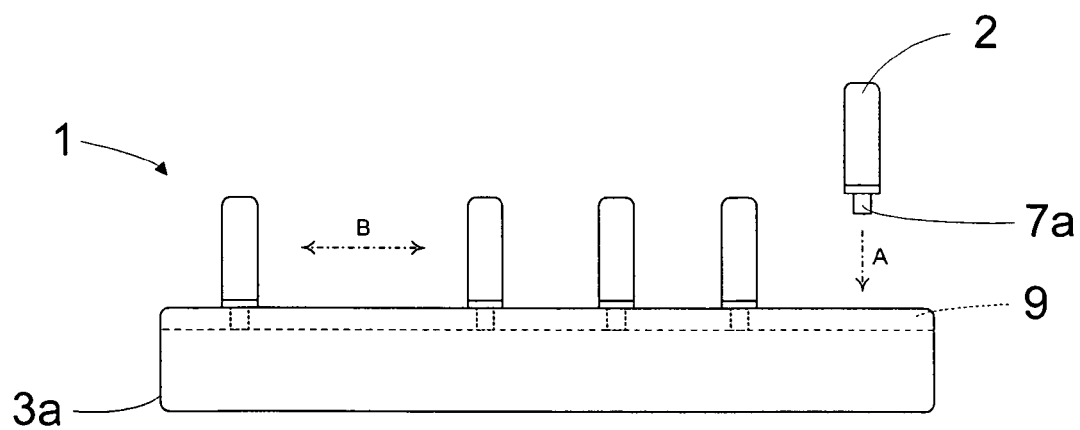
FIG. 10 shows a tailgate protector similar to FIG. 9 with the exception of having protrusions that are horizontally positionable.
Figure 11:
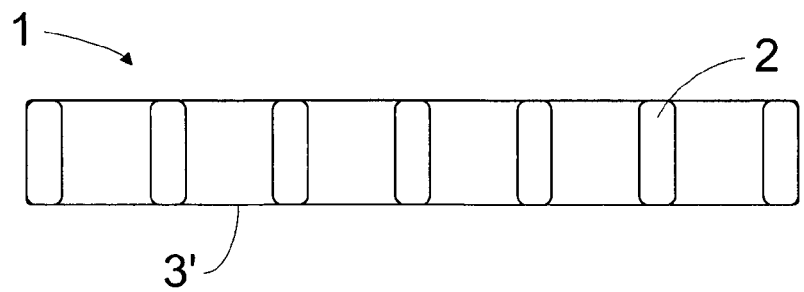
FIGS. 11 to 14 show example top views of various tailgate protectors of the present invention.
Figure 17:
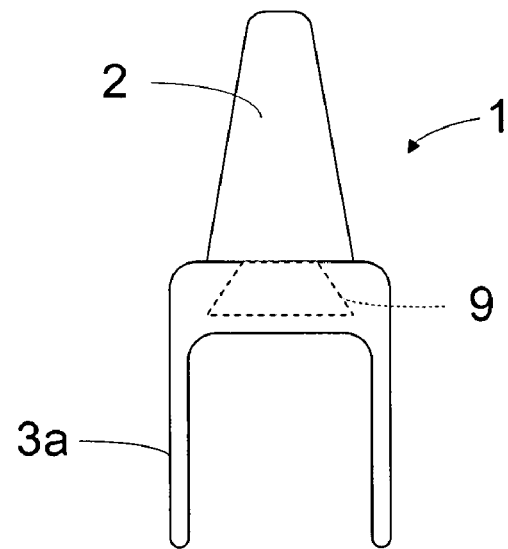
FIG. 17 shows a side view similar to FIG. 16 with the exception of having a closed-end track.

FIG. 10 shows a tailgate protector 1 similar to that of FIG. 9 except that the base section 3*a* comprises an elongated receiving component 9 similar to that of FIG. 8A. The elongated receiving component 9 could be comprised of a groove-like recess or track in which the individual protrusions 2 are inserted. The elongated receiving component 9 would preferably be integrally formed or captivated as part of the base section 3*a*. The elongated receiving component 9 would allow the individual protrusions 2 to be horizontally positionable, as indicated by arrow B, in order to provide various spacings between protrusions 2. In one example, the elongated receiving component 9 could have detents associated with it in order to lock the protrusions 2 in their selected positions. The protrusions 2 might be released and repositioned by either pushing down or pulling up on them and then moving them to detents associated with the desired positions. In another example, the connecting component 7*a* of each individual protrusion 2 could mate to the elongated receiving component 9 using a tongue and groove method similar to that in the above discussion of FIG. 8A. The groove associated with the elongated receiving component 9 could be either open-ended or closed-ended like the side views shown in FIGS. 16 and 17, respectively, where the example joint is shown to resemble that of a dovetail joint. The individual protrusions 2 could be positioned within the groove using a method such as friction-fitting, in such a manner that the protrusion 2 could be placed into position by the user but not moved out of position by the forces of the load. In some instances, the connecting component 7*a* could be made such that the protrusion 2 is initially rotated at an angle, such as 90 degrees, in order to insert it into or move it along the groove of the elongated receiving component 9. Once the desired position has been reached, the protrusion 2 could then be rotated an additional 90 degrees in order to lock it into position within the groove of the elongated receiving component 9.

Figure 12:
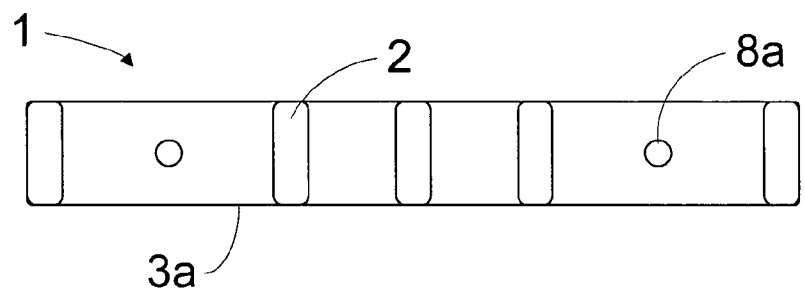
Figure 13:
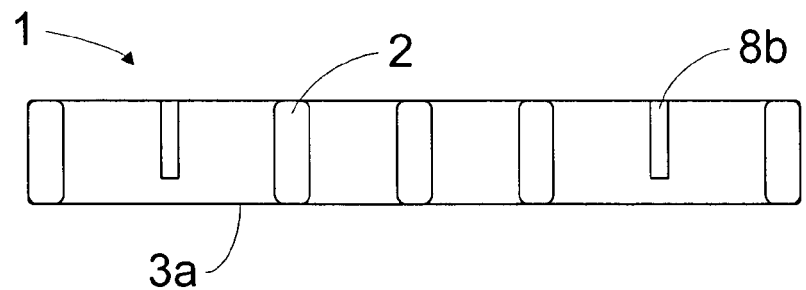
Figure 14:
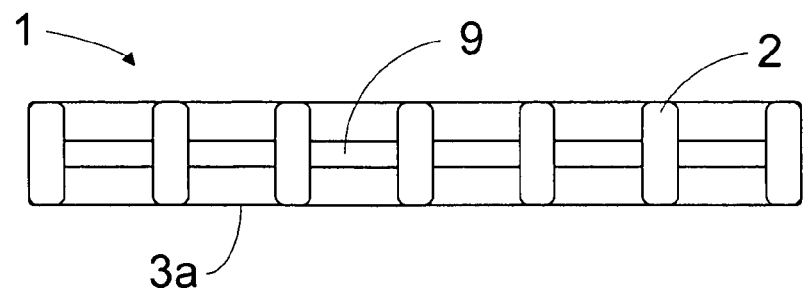

FIGS. 11 through 14 show example top views that could be representative of the tailgate protectors 1 of the various embodiments introduced in the above discussions. For example, FIG. 11 could represent the top view of a tailgate protector 1 similar to those introduced in FIGS. 2, 3, and 4, in which case the structural component 3' would represent the structural frame 3. Furthermore, FIG. 11 could represent the top view of a tailgate protector 1 similar to those introduced in FIGS. 7A and 8A, in which case the structural component 3' would represent the mated upper section 3*b* and base section 3*a*. FIGS. 12 and 13 could represent the top view of a tailgate protector 1 similar to that introduced in FIG. 9, where FIG. 12 shows an example of a circular-shaped receiving component 8*a*, and FIG. 13 shows an example of a groove-shaped receiving component 8*b*. FIG. 14 could represent the top view of a tailgate protector 1 similar to that introduced in FIG. 10.

Figure 15:
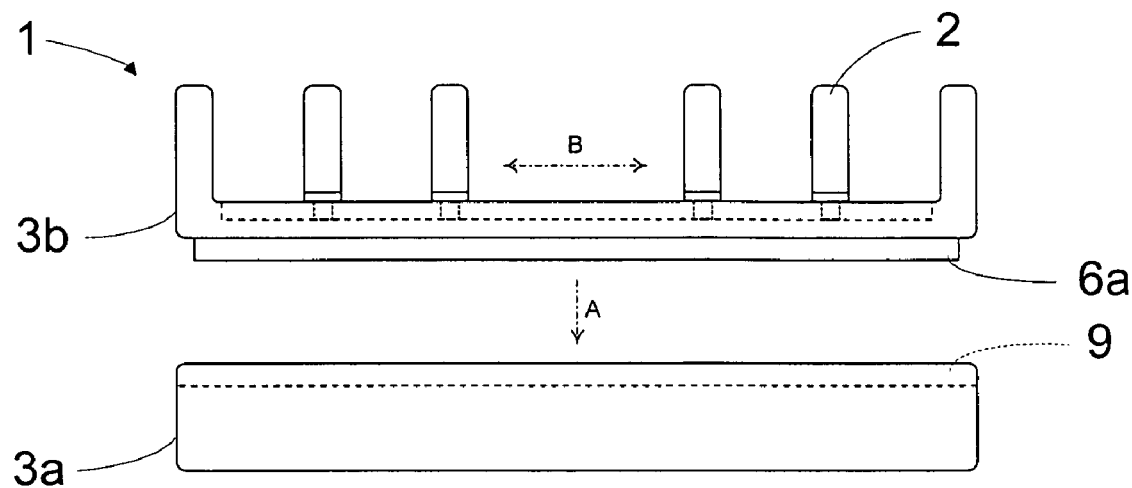
FIG. 15 shows an example of the present invention where the tailgate protector comprises a combination of features similar to those of FIGS. 8A and 10.

FIG. 15 shows an example of how the tailgate protector 1 could comprise various combinations of the construction methods discussed in the above embodiments. The tailgate protector 1 is similar to that of FIG. 8A except that the protrusions 2 associated with the upper section 3*b* are horizontally positionable, as indicated by arrow B. The horizontal positioning of the protrusions 2 is shown to be accomplished using a construction method similar to that introduced in FIG. 10. In accordance with this illustration, other combinations of the above embodiments would also be possible.

Figures 18A, 18B:
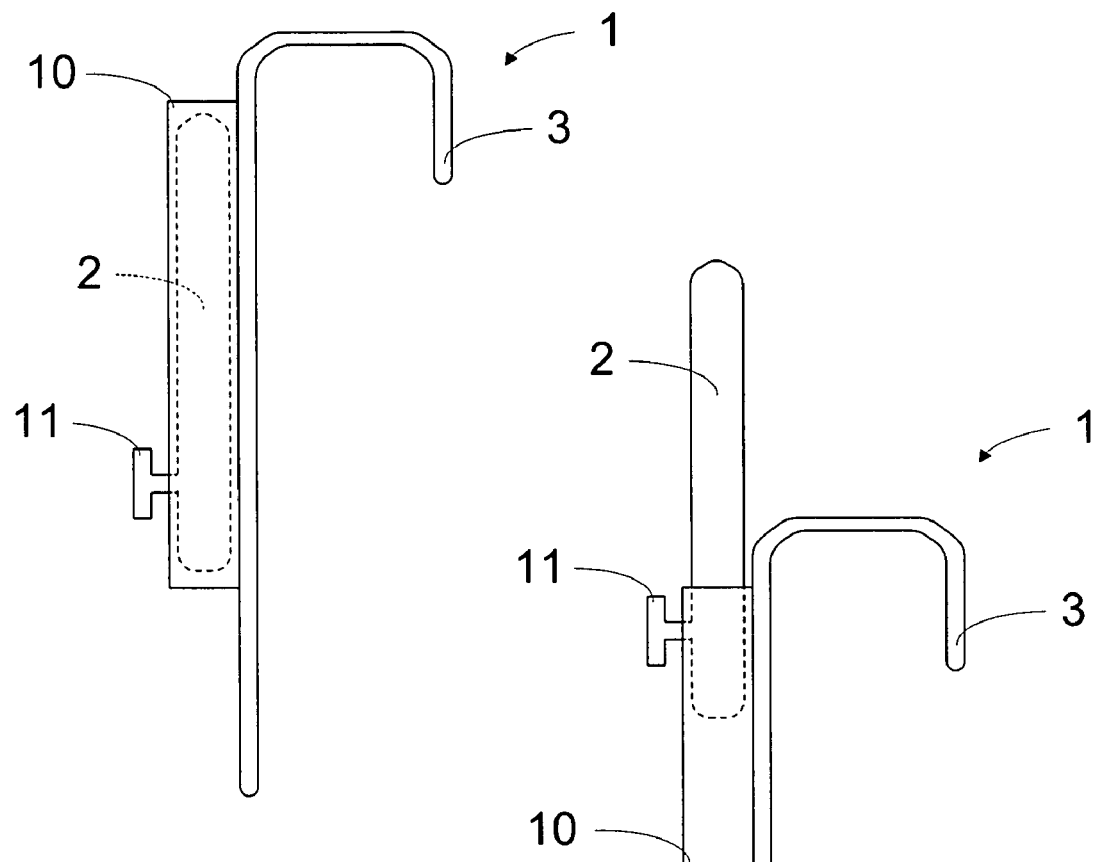
FIGS. 18A and 18B show example side views of the present invention where the protrusions of the tailgate protector are vertically positionable.
Figure 19:
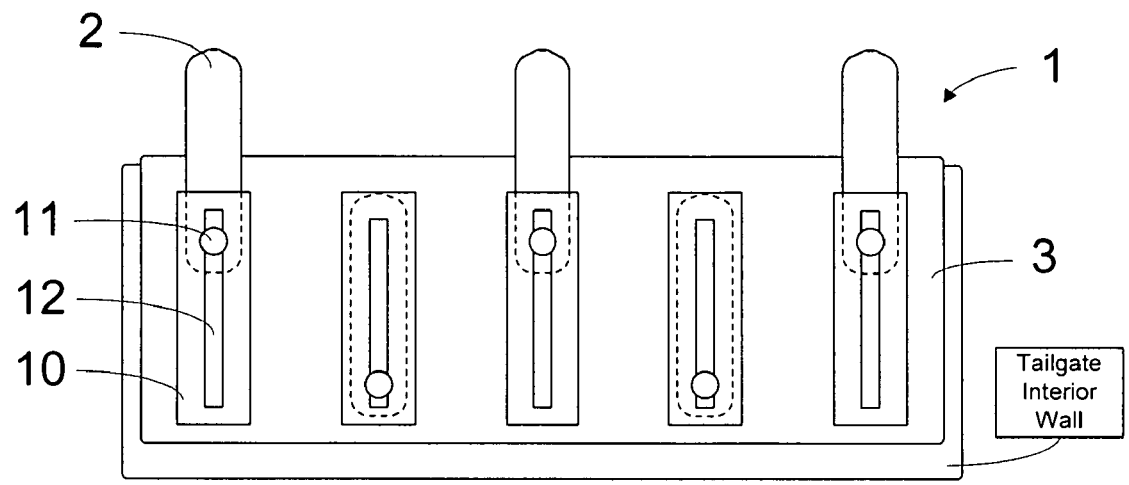
FIG. 19 shows an example rear view of the tailgate protector of FIGS. 18A and 18B.

FIGS. 18A, 18B, and 19 show an example embodiment of the present invention where the tailgate protector 1 comprises a structural frame 3 and a plurality of protrusions 2 that are vertically positionable. The tailgate protector 1 further comprises a plurality of protrusion retainers 10 that are integrally formed or attached to the structural frame 3. The protrusions 2 are selectably raised or lowered above or below the upper edge of the vehicle tailgate while being retained by the protrusion retainers 10. The vertical positioning of a protrusion 2 could be accomplished by various adjusting means, such as using the combination of an adjusting slot 12 in the protrusion retainer 10 and an adjusting knob 11 connected to the protrusion 2. The protrusion 2 could be locked into position by various locking means, such as using an adjusting knob 11 that is rotatably clamping or by having detents associated with the protrusion retainer 10. This arrangement allows the user to select which protrusions 2 are raised above the upper edge of the vehicle tailgate so as to obtain various spacings between protrusions 2.

Figure 20:
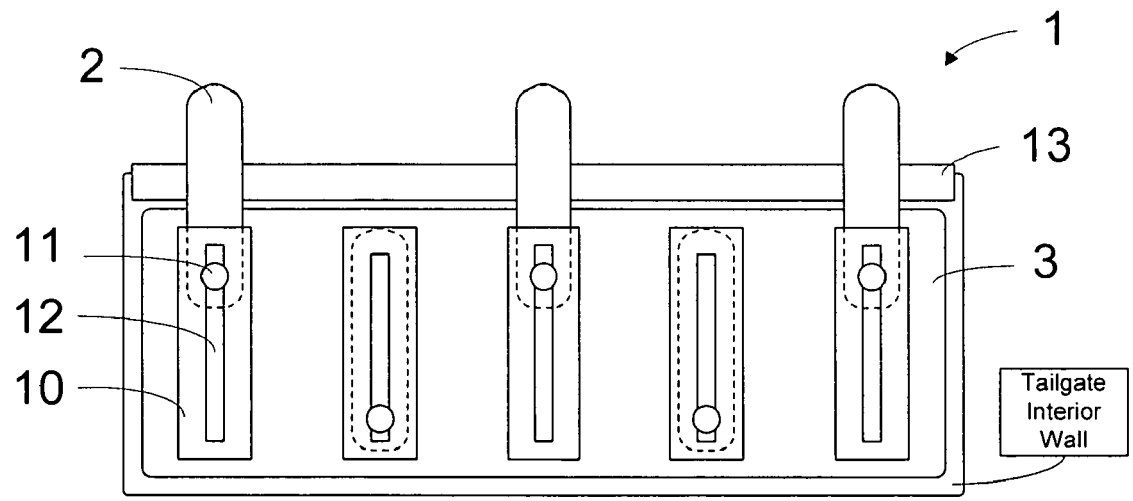
FIG. 20 shows a tailgate protector similar to FIG. 19 with the exception of having a separate component for covering the upper edge of the tailgate.

FIG. 20 shows a tailgate protector 1 similar to that of FIG. 19 with the exception of having a separate cover component 13 covering the upper edge of the vehicle tailgate. In this embodiment, the assembly comprising the structural frame 3, protrusion retainers 10, and protrusions 2 would mount to the interior wall of the vehicle tailgate, while the separate cover component 13 would mount to the upper edge of the tailgate.

Figure 21:
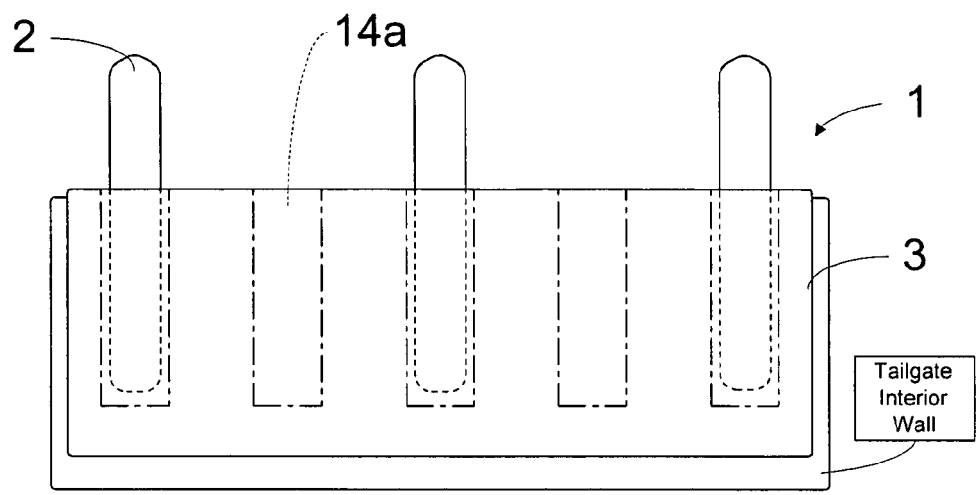
FIG. 21 shows an example rear view of the present invention where the tailgate protector comprises protrusion-loadable slots.
Figure 22:
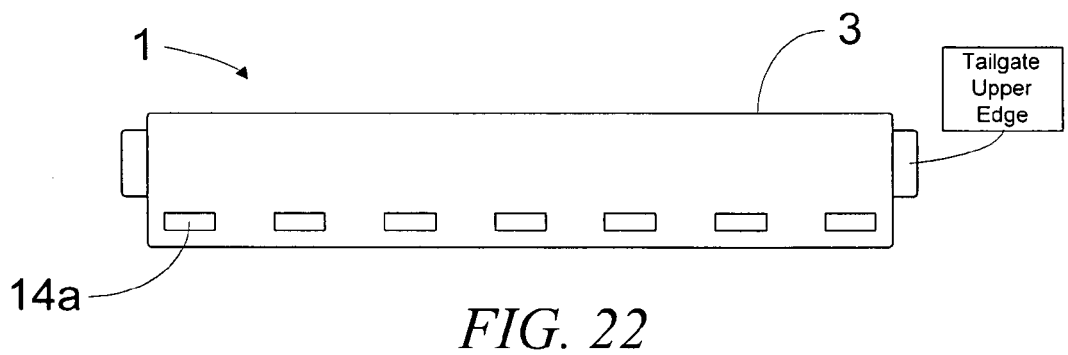
FIG. 22 shows an example top view of the tailgate protector of FIG. 21.

FIGS. 21 and 22 show an example embodiment of the present invention where the tailgate protector 1 comprises a plurality of individual protrusions 2 and a structural frame 3 having a plurality of protrusion slots 14*a*. The protrusion slots 14*a* could be integrally formed or attached to the structural frame 3. The individual protrusions 2 would be selectably placed into the protrusion slots 14*a* in order to obtain the desired spacing between protrusions 2. The protrusions 2 would be of sufficient length so that a portion of the protrusion 2 would extend above the upper edge of the vehicle tailgate when inserted into the protrusion slot 14*a*. Similar to the concept introduced in FIG. 19, this tailgate protector 1 could also be constructed using the separate cover component 13 introduced in FIG. 20.

Figure 23:
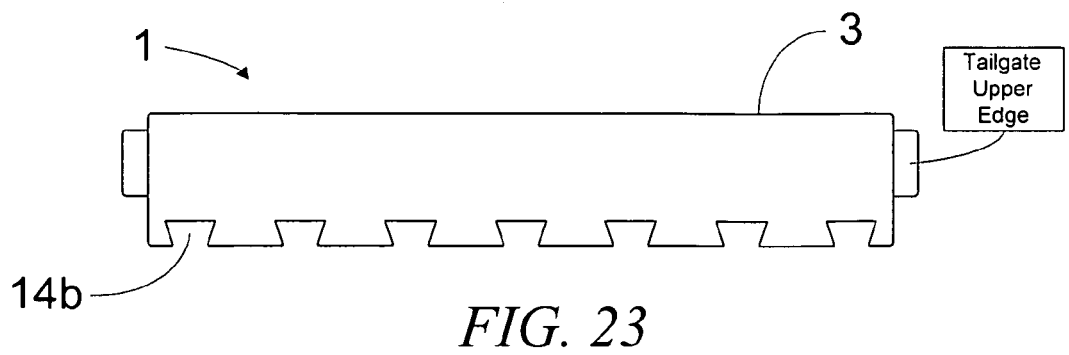
FIG. 23 shows a top view similar to FIG. 22 with the exception of having groove-like slots.

FIG. 23 shows a tailgate protector 1 similar to that of FIGS. 21 and 22 with the exception of having groove-like protrusion slots 14b. In this embodiment, the protrusion itself (not shown) or an integral tongue associated with the protrusion would be shaped to mate with the groove-like protrusion slot 14b.

Figures 24A, 24B:
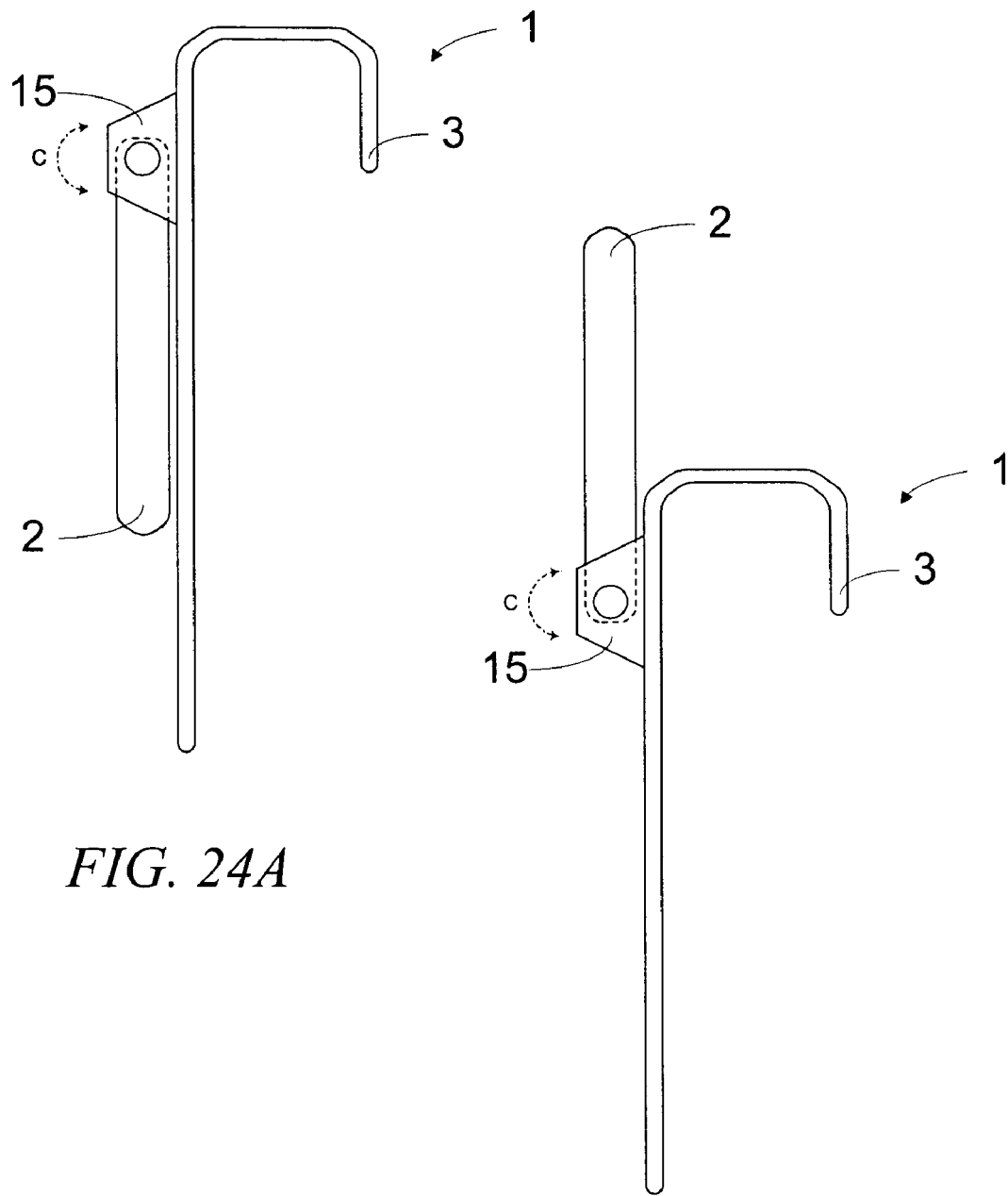
FIGS. 24A and 24B show example side views of the present invention where the protrusions of the tailgate protector are rotatably positionable.
Figure 25:
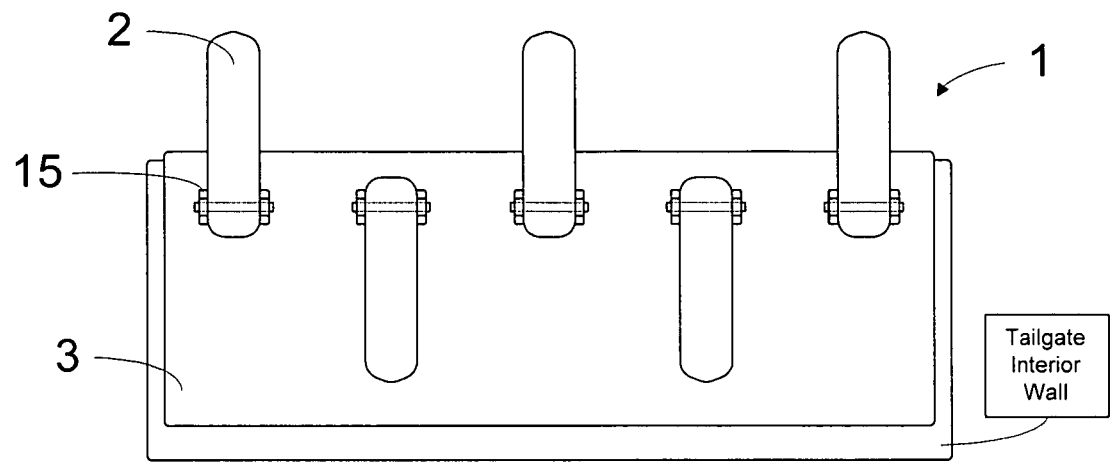
FIG. 25 shows an example rear view of the tailgate protector of FIGS. 24A and 24B.

FIGS. 24A, 24B, and 25 show an example embodiment of the present invention where the tailgate protector 1 comprises a structural frame 3 and a plurality of protrusions 2 that are rotatably positionable. The tailgate protector 1 further comprises a plurality of pivot components 15 that could be integrally formed or attached to the structural frame 3. The pivoting could be accomplished using a hinge-like device, such as a bracket and pivot pin arrangement, or other similar pivoting method. As illustrated in FIGS. 24A and 24B, one end of the protrusion 2 would mount to the pivot component 15 in such a manner so as to allow the protrusion 2 to angularly rotate in the direction indicated by arrow C. The rotation angle is shown to approximate 180 degrees in this example. FIG. 24A shows the protrusion 2 in a lowered position where it would be situated below the upper edge of the vehicle tailgate, while FIG. 24B shows the protrusion 2 in a raised position where it would be situated above the upper edge of the vehicle tailgate. The protrusion 2 could be locked in the raised position using techniques similar to those introduced in the above discussion of FIGS. 18A, 18B, and 19. This arrangement would allow the user to selectably rotate the protrusions 2 into the raised or lowered position in order to obtain the desired spacing between protrusions 2.

Figure 26:
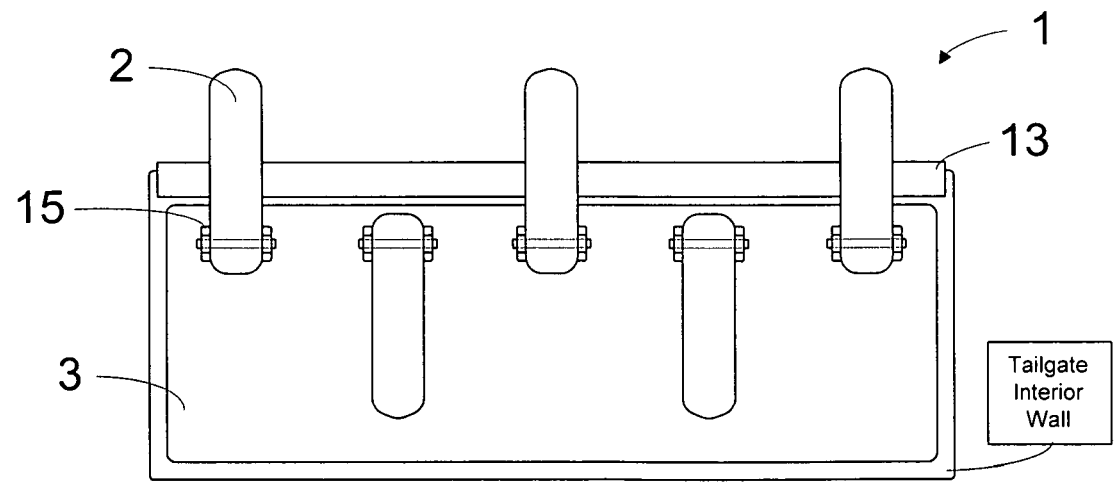
FIG. 26 shows a tailgate protector similar to FIG. 25 with the exception of having a separate component for covering the upper edge of the tailgate.

FIG. 26 shows a tailgate protector 1 similar to that of FIG. 25 with the exception of having a separate cover component 13 covering the upper edge of the vehicle tailgate. In this embodiment, the assembly comprising the structural frame 3, pivot components 15, and protrusions 2 would mount to the interior wall of the vehicle tailgate, while the separate cover component 13 would mount to the upper edge of the vehicle tailgate.

Figure 27:
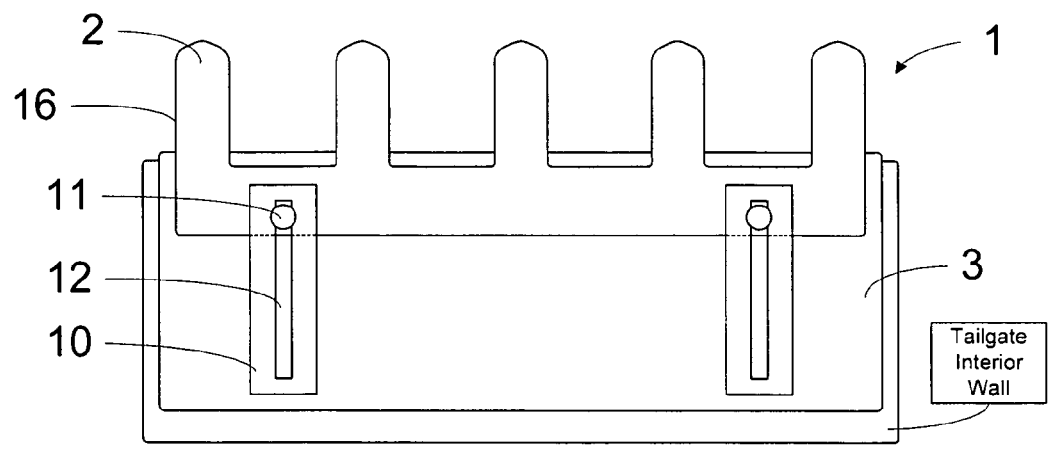
FIG. 27 shows a tailgate protector similar to FIG. 19 with the exception of having a protrusion assembly instead of individual protrusions.

FIG. 27 shows a tailgate protector 1 similar to that of FIG. 19 except that the protrusions 2 are grouped on a protrusion assembly 16. The tailgate protector 1 is shown to comprise a pair of protrusion retainers 10 that are integrally formed or attached to the structural frame 3. The protrusion assembly 16 is vertically raised or lowered above or below the upper edge of the vehicle tailgate while being retained by the protrusion retainers 10. The vertical positioning of the protrusion assembly 16 could be accomplished using techniques similar to those introduced in the above discussion of FIGS. 18A, 18B, and 19. This arrangement allows the protrusion assembly 16 to be selectably positioned above or below the upper edge of the vehicle tailgate depending on the user's needs.

Figure 28:
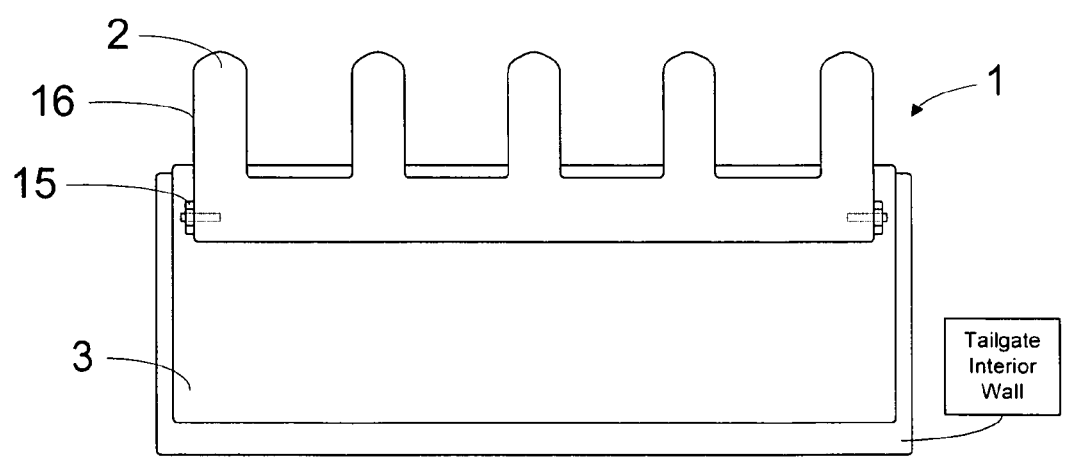
FIG. 28 shows a tailgate protector similar to FIG. 25 with the exception of having a protrusion assembly instead of individual protrusions.

FIG. 28 shows a tailgate protector 1 similar to that of FIGS. 24A, 24B, and 25 except that the protrusions 2 are grouped on a protrusion assembly 16. The tailgate protector 1 comprises pivot components 15 that could be integrally formed or attached to the structural frame 3. One end of the protrusion assembly 16 would mount to the pivot components 15 in such a manner so as to allow the protrusion assembly 16 to angularly rotate above or below the upper edge of the vehicle tailgate. FIG. 24A could represent the endmost protrusion 2 in a lowered position where the protrusion assembly 16 would be situated below the upper edge of the vehicle tailgate, while FIG. 24B could represent the endmost protrusion 2 in a raised position where the protrusion assembly 16 would be situated above the upper edge of the vehicle tailgate. The protrusion assembly 16 could be locked in the raised position using techniques similar to those introduced in the above discussion of FIGS. 18A, 18B, and 19. This arrangement allows the protrusion assembly 16 to be selectably positioned above or below the upper edge of the vehicle tailgate depending on the user's needs.

Figure 29:
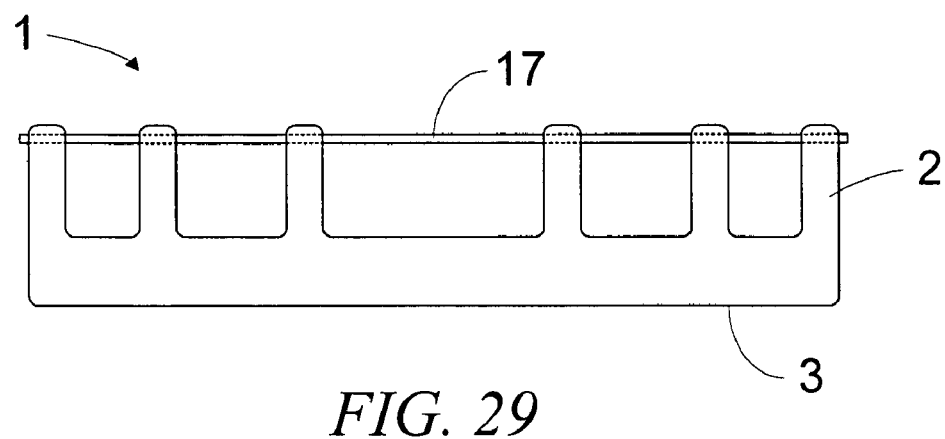
FIG. 29 shows a tailgate protector similar to FIG. 4 with the exception of having a vertical-movement restraining component.
Figures 30, 31:
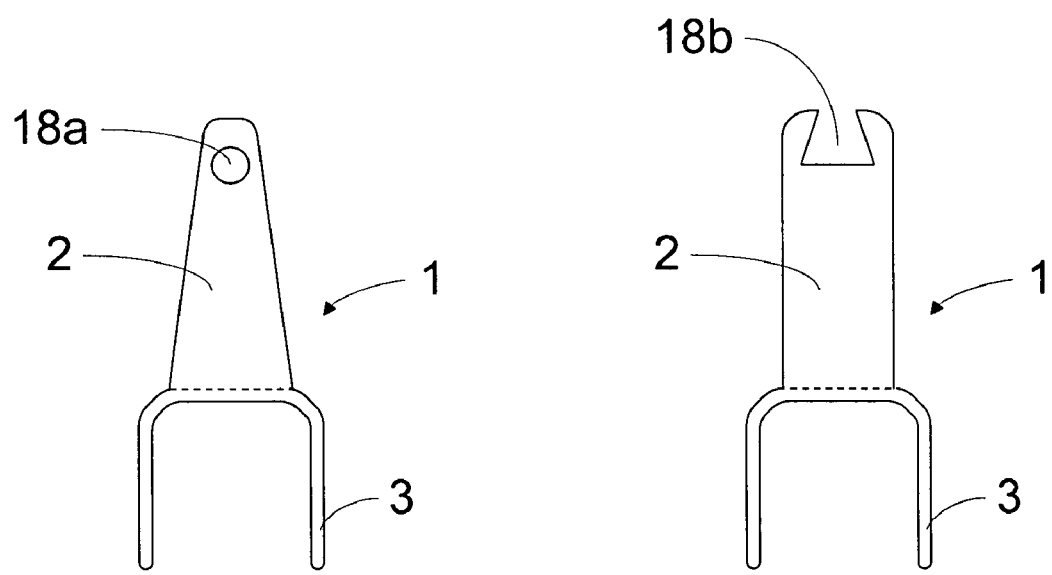
FIGS. 30 and 31 show example side views of the present invention where the tailgate protector has provisions to accept a vertical-movement restraining component.

FIG. 29 shows a tailgate protector 1 similar to that of FIG. 4 with the exception of having a vertical-movement restrainer 17. The vertical-movement restrainer 17 might be used, for example, to limit the vertical movement of lightweight transported material. The vertical-movement restrainer 17 could be comprised of a rod or similar device that would be inserted through holes or grooves in the protrusions 2, such as the accepting hole 18a or accepting groove 18b shown in the side view examples of FIGS. 30 and 31, respectively. The vertical-movement restrainer 17 could be secured in place by using methods such as pinning, pressure fitting, spring fitting, or other similar securing methods. For example, the vertical-movement restrainer 17 could be a rod with a spring-loaded depressible pin on one end and a stop on the other end. The spring-loaded pin would be depressed when passed through the protrusions 2 and allowed to snap outward into a locking position after passing through the last protrusion 2, coinciding with the stop on the other end of the vertical-movement restrainer 17 reaching the first protrusion 2. Although the vertical-movement restrainer 17 is shown to pass through all of the protrusions 2 in the illustration, it could be provided in various lengths so as to pass through only a certain number of protrusions 2.

Figure 32:
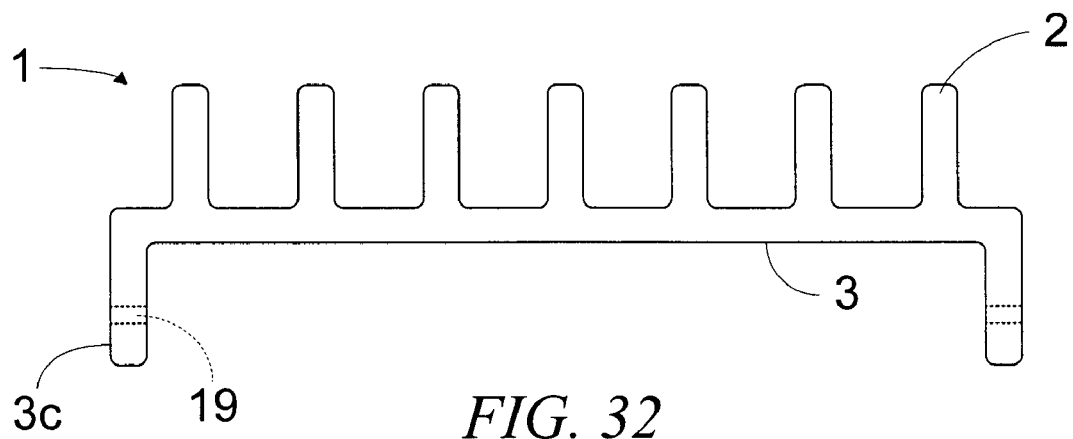
FIG. 32 shows an example of the present invention where the tailgate protector comprises integral legs that would mount into the bed rail openings of a pickup truck or similar vehicle.
Figure 33:
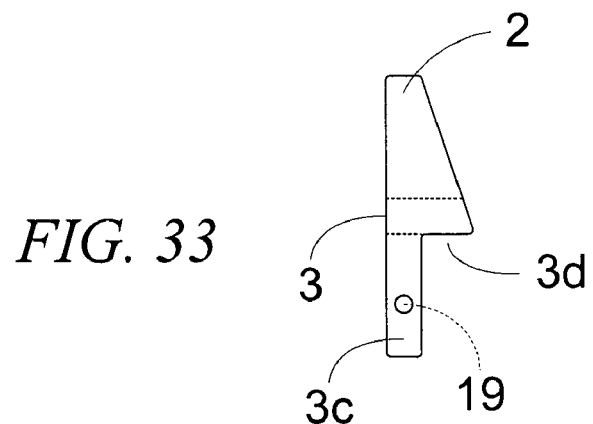
FIG. 33 shows an example side view of the tailgate protector of FIG. 32.

FIGS. 32 and 33 show an example embodiment of the present invention where the tailgate protector 1 comprises a plurality of protrusions 2 combined with a structural frame 3. The structural frame 3 further comprises a pair of integral mounting legs 3c with mounting holes 19. The mounting legs 3c would normally be inserted into the rearmost set of stake pockets in the bed rails of a pickup truck or similar vehicle. The mounting holes 19 in the mounting legs 3c would normally coincide with existing holes associated with the stake pocket side walls, allowing for the insertion of retaining pins. As shown in FIG. 33, the structural frame 3 preferably comprises a ledge portion 3d that would extend over and rest upon the upper edge of the vehicle tailgate, so as to transfer the weight of the transported material to the vehicle tailgate. Otherwise, the structural frame 3 would need to include additional reinforcement to transfer the weight of the material to the bed rails. As in the case of the preferred embodiment, this tailgate protector 1 would ideally be constructed as a one-piece assembly. In one approach, the protrusions 2 and/or mounting legs 3c might be separate items that are fixedly attached to the structural frame 3 using standard attaching hardware or an attaching process such as staking, welding, riveting, adhesive bonding, or similar process. A more preferred approach would be to construct the tailgate protector 1 as a true one-piece assembly where the structural frame 3, protrusions 2, and integral legs 3c are contiguously formed from one material. This could be accomplished, for example, by using a process such as injection molding, heat forming, stamping, casting, pressing, or other similar molding, forming, or shaping process.

Figure 34:
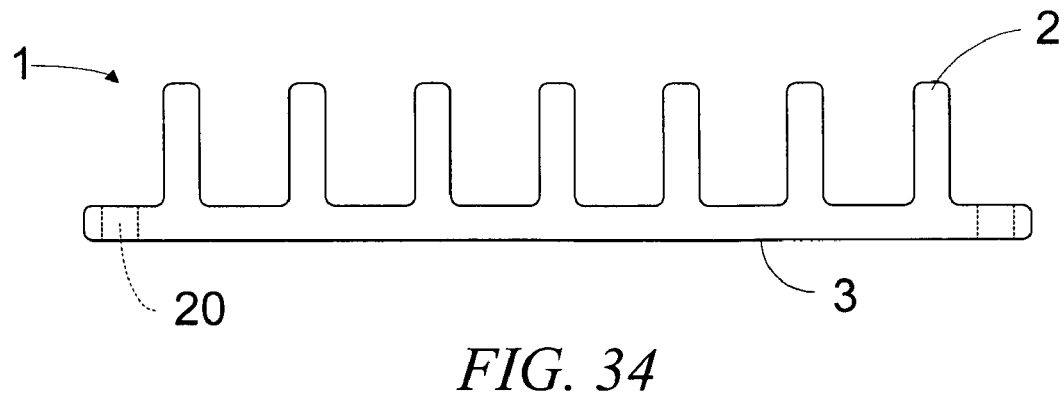
FIG. 34 shows a tailgate protector similar to FIG. 32 with the exception of having mounting openings instead of integral legs.

FIG. 34 shows a tailgate protector 1 similar to that of FIG. 32 except that the structural frame 3 does not include the integral legs 3c. Instead, the structural frame 3 includes mounting openings 20 that would normally coincide with the rearmost set of stake pockets in the bed rails of a pickup truck or similar vehicle. The tailgate protector 1 could, therefore, be mounted to the vehicle by inserting components through the mounting openings 20 and into the stake pockets in the bed rails. The inserted components could be other vehicle accessories such as tie-down anchors, side rails, stake fences, and the like. The structural frame 3 of this tailgate protector 1 would also preferably comprise the ledge portion 3*d* of FIG. 33 in order to transfer the weight of the transported material to the vehicle tailgate.

SUMMARY AND SCOPE

Accordingly, the reader will see that the present invention is a new and improved tailgate protector that, in addition to providing protection for the upper edge of a vehicle tailgate, provides a quick and convenient means for reliably securing the material being transported by the vehicle and supported by the tailgate edge. The tailgate protector comprises a structural frame that is combined with a plurality of spaced protrusions that perpendicularly extend above the upper edge of the closed tailgate. The spacing and height of the protrusions allow transported material to be placed between the protrusions so as to confine the side to side movement of the material, therefore providing an effective means for securing the material. This securing feature of the tailgate protector simplifies the material loading process by eliminating the need for securing implements such as rope, twine, straps, bungee cords, and the like. This feature also prevents possible vehicle damage and/or potentially dangerous situations that can occur when transporting material that is either originally unsecured or that which has become unsecured due to failure of a securing implement. Furthermore, the reader will see that the tailgate protector can be constructed in various forms to accommodate different mounting configurations and degrees of service. Depending on its manufactured form, the tailgate protector can be provided as part of original vehicle equipment, as a dealer installed accessory, as an aftermarket accessory, or as a temporary transporting device.

Although the description of the present invention contains many specificities, these should only be construed as illustrations of some of the presently preferred embodiments of the invention, and not a limitation of the spirit and scope of the invention. Accordingly, many more variations may become apparent to one skilled in the art. Therefore, the scope of the present invention should be determined by the attached claims and their legal equivalents, rather than be limited to the specific examples given.

I claim:

1. A material-securing tailgate protector for securing transported material supported by an upper edge of a closed vehicle tailgate, said protector comprising:

an inverted generally U-shaped structural frame comprising two downwardly projecting vertical leg members connected by a straight horizontal bight portion and being sufficiently sized and shaped to mount to said upper edge of said closed vehicle tailgate, said frame in contact with and substantially covering said upper edge of said closed vehicle tailgate; said frame including a plurality of upwardly projecting spaced protrusions perpendicularly extending above a horizontal topmost load bearing surface of said upper edge of said closed vehicle tailgate, said protrusions having sufficient vertical length and horizontal spacing to accommodate placement of and restrict horizontal movement of said transported material, whereby said upper edge of said closed vehicle tailgate becomes protected by said structural frame while said transported material supported by said upper edge of said closed vehicle tailgate becomes effectively secured solely by being placed between spaced instances of said protrusions without the use of additional securing implements.

* * * * *